Patented Oct. 10, 1944

2,360,295

UNITED STATES PATENT OFFICE 2,360,295

PREPARATION OF PHENOTHIAZINE

Alexander H. Widiger, Jr., Midland, Mich., assignor to The Dow Chemical Company, Midland, Mich., a corporation of Michigan No Drawing. Application February 27, 1942, Serial No. 432,641

8 Claims. (Cl. 260—243)

This invention concerns an improved method for the production of phenothiazine.

It is well known that phenothiazine may be prepared by reacting sulphur with diphenylamine in accordance with the equation:

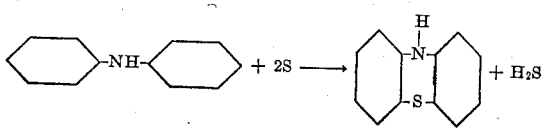

and that the reaction may be promoted by the presence of any of a number of condensation catalysts such aluminum chloride, aluminum bromide, iodine, ferric chloride, antimony chloride, copper iodide, or sulphur iodide, etc. The reaction has in all instances heretofore been carried out by heating diphenylamine with the stoichiometric proportion or more of sulphur (i. e. employing at least 2 gram atomic weights of sulphur per gram molecular weight of diphenylamine) to a temperature at which the mixture reacts to evolve hydrogen sulphide. When the reaction is carried out in this usual manner tarry by-products are formed in considerable amount at the expense of the desired phenothiazine product.

I have now found that the formation of by-products may be reduced and the yield of phenothiazine improved by carrying the reaction out in the presence of a considerable excess of diphenylamine over that theoretically required for the reaction. I have further found that the excess of diphenylamine may satisfactorily be distilled from the product and be employed as the excess of diphenylamine in preparing a subsequent similar sized batch of phenothiazine. However, the recovered excess of diphenylamine is not satisfactory, unless further purified, for direct use (i. e. without addition of fresh diphenylamine) in preparing phenothiazine, since it apparently includes impurities which promote tar formation when it is heated in undiluted form with sulphur.

In preparing phenothiazine by the present method sulphur is heated together with an excess of diphenylamine to a temperature at which the mixture reacts to evolve hydrogen sulphide. The reaction is usually carried out at temperatures between 150° and 250° C., preferably between 160° and 200° C., in the presence of a small proportion of one of the condensation catalysts hereinbefore mentioned, preferably aluminum chloride or iodine.

By-product formation decreases quite sharply and the yield of phenothiazine is increased correspondingly as the proportion of diphenylamine is increased from the amount theoretically required to an approximately 30 per cent excess of diphenylamine over the stoichiometric amount. Larger proportions of diphenylamine, e. g. a from 30 to 200 per cent excess of dipheneylamine, may of course be used, but the further decrease in by-product formation obtained by employing such large excess is usually not sufficient to warrant the extra expense involved. In practice the diphenylamine is usually employed in amount exceeding the stoichiometric proportion by between 10 and 50 per cent, and preferably between 15 and 40 per cent. The excess of diphenylamine is preferably added before starting the reaction, but it may be added during the reaction if desired.

Heating of the reaction mixture is continued until the evolution of hydrogen sulphide substantially ceases. When operating in the presence of aluminum chloride or iodine as the catalyst, at the usual reaction temperatures of 160°-200° C., the reaction is usually complete in from 1 to 4 hours, but longer heating may sometimes be required.

The catalyst is then removed or rendered inactive in any of a number of ways, such as by washing with a dilute aqueous solution of an alkali or by adding a solid or slightly moist alkali such as sodium or potassium hydroxide or a corresponding carbonate or bicarbonate, and the product is separated, e. g. by distillation, sublimation or by recrystallization from a solvent such as alcohol or toluene, etc. In practice the product is preferably separated by adding a small proportion, e. g. about 0.5 to 2 per cent by weight, of an alkali to the reaction mixture and distilling the latter under vacuum. As hereinbefore mentioned, the diphenylamine recovered as a fore-fraction in the distillation is not satisfactory, unless further purified, for the formation of additional phenothiazine by heating the same with sulphur alone, since tarry by-products are formed in large amount when it is so-employed. However, it may be employed together with an equal or larger amount of freshly added diphenylamine in preparing additional phenothiazine. For instance, it may be added as the excess of diphenylamine to a mixture of sulphur and fresh diphenylamine in the stoichiometric proportions and thus be employed in preparing another similar sized batch of phenothiazine. When re-employed in this manner the recovered diphenylamine does not cause an appreciable increase in by-product formation.

By carrying the reaction out as just described, phenothiazine of good quality may be obtained in excellent yields, e. g. in yields above 90 per cent and usually between 94 and 98 per cent of theoretical.

The following examples describe certain ways in which the principle of the invention has been applied, but are not to be construed as limiting the invention.

Example 1

In each of three experiments diphenylamine and sulphur in the parts by weight stated in the following table were heated together with a small portion, i. e. from 0.15 to 0.8 per cent by weight, of iodine, to a temperature of 175° C. for 2 hours and then to 200° C. for another 2 hour period, by the end of which time the evolution of hydrogen sulphide had substantially ceased. The hot molten mixture was treated with a small amount, i. e. from 0.5 to 2 per cent by weight, of finely divided sodium hydroxide and fractionally distilled at about 25 millimeters absolute pressure. The table gives the proportions, as parts by weight, of sulphur and diphenylamine employed in each experiment, the per cent by which the diphenylamine was in excess over the stoichiometric proportion, and the parts by weight of unreacted diphenylamine and of phenothiazine obtained in the distillate and of by-products remaining as the residue from the distillation. The table also gives the per cent yield of phenothiazine based on the diphenylamine consumed in the reaction.

| Run No. | Reactants | | | Products | | | Percent yield of phenothiazine |
|---|---|---|---|---|---|---|---|
| | Sulphur parts | Diphenylamine | | Diphenylamine parts | Phenothiazine parts | By-products parts | |
| | | Parts | Percent excess over theoretical amount | | | | |
| 1 | 1 | 2.64 | 0 | 0.139 | 2.61 | 0.391 | 88.5 |
| 2 | 1 | 3.12 | 18 | 0.566 | 2.87 | 0.131 | 95.5 |
| 3 | 1 | 3.42 | 30 | 0.845 | 2.96 | 0.088 | 97.3 |

Example 2

A mixture of 422 grams (2.5 moles) of diphenylamine, 135 grams (4.2 gram atomic weights) of sulphur and 3.5 grams of aluminum chloride (which mixture contained the diphenylamine in 19 per cent excess over the stoichiometric proportion) was heated at 175° C. for 2 hours and then at 200° C. for another 2 hour period. The mixture was then treated with 1 per cent by weight of finely divided sodium hydroxide and fractionally distilled at approximately 25 millimeters absolute pressure. There was collected 74 grams (0.437 mole) of unreacted diphenylamine and 390 grams (1.96 moles) of phenothiazine. 27 grams of higher boiling by-products remained as the residue from the distillation. The yield of phenothiazine was 95 per cent of theoretical, based on the diphenylamine consumed.

Other modes of applying the principle of the invention may be employed instead of those explained, change being made as regards the method herein disclosed, provided that the step or steps stated by any of the following claims or the equivalent of such stated step or steps be employed.

I therefore particularly point out and distinctly claim as my invention:

1. The method of making phenothiazine which comprises reacting sulphur with diphenylamine in the presence of an appreciable excess of the latter and a catalyst for the reaction.

2. The method which comprises heating sulphur and at least 10 per cent excess of diphenylamine over the amount required to react with the sulphur in forming phenothiazine to a reaction temperature in the presence of a catalyst for the reaction.

3. The method which comprises heating sulphur and at least a 10 per cent excess of diphenylamine over the amount required to react with the sulphur in forming phenothiazine to a reaction temperature in the presence of a catalytic proportion of aluminum chloride.

4. The method which comprises heating sulphur and at least a 10 per cent excess of diphenylamine over the amount required to react with the sulphur in forming phenothiazine, to a reaction temperature in the presence of a catalytic proportion of iodine.

5. In a method for the production of phenothiazine, the steps which consist in heating sulphur and an at least 10 per cent excess of diphenylamine to a reaction temperature, distilling diphenylamine from the reacted mixture, and returning the recovered diphenylamine together with a larger proportion of freshly added diphenylamine to the first of the foregoing steps.

6. In a method for the production of phenothiazine, the steps which consist in heating a mixture of sulphur and at least a 10 per cent excess of diphenylamine in the presence of a condensation catalyst to a reaction temperature between 160° and 200° C., thereafter distilling diphenylamine from the reacted mixture and returning the recovered diphenylamine together with a larger amount of freshly added diphenylamine to the first of the foregoing steps.

7. In a method for the production of phenothiazine, the steps which consist in heating a mixture of sulphur, at least a 10 per cent excess of diphenylamine over the amount required to react with the sulphur in forming phenothiazine, and a catalytic proportion of aluminum chloride to a reaction temperature between 160° and 200° C., thereafter treating the reacted mixture with a small amount of an alkali, distilling unreacted diphenylamine from the mixture and returning the recovered diphenylamine together with a larger amount of freshly added diphenylamine to the first of the foregoing steps.

8. In a method for the production of phenothiazine, the steps which consist in heating a mixture of sulphur, at least a 10 per cent excess of diphenylamine over the amount required to react with the sulphur in forming phenothiazine, and a catalytic proportion of iodine to a reaction temperature between 160° and 200° C., thereafter treating the reacted mixture with a small amount of an alkali, distilling unreacted diphenylamine from the mixture and returning the recovered diphenylamine together with a larger amount of freshly added diphenylamine to the first of the foregoing steps.

ALEXANDER H. WIDIGER, Jr.